US008788672B2

(12) United States Patent
Heller, Jr.

(10) Patent No.: US 8,788,672 B2
(45) Date of Patent: *Jul. 22, 2014

(54) MICROPROCESSOR WITH SOFTWARE CONTROL OVER ALLOCATION OF SHARED RESOURCES AMONG MULTIPLE VIRTUAL SERVERS

(75) Inventor: Thomas J. Heller, Jr., Rhinebeck, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/457,071

(22) Filed: Apr. 26, 2012

(65) Prior Publication Data

US 2012/0271952 A1 Oct. 25, 2012

Related U.S. Application Data

(63) Continuation of application No. 12/392,665, filed on Feb. 25, 2009.

(51) Int. Cl.
*G06F 15/173* (2006.01)
(52) U.S. Cl.
USPC .......................................................... 709/226
(58) Field of Classification Search
None
See application file for complete search history.

(56) References Cited

U.S. PATENT DOCUMENTS

| | | | |
|---|---|---|---|
| 6,754,206 B1 * | 6/2004 | Nattkemper et al. | ......... 370/369 |
| 7,117,499 B2 | 10/2006 | Kawamoto et al. | |
| 2001/0014928 A1 | 8/2001 | Chrysos et al. | |
| 2002/0016892 A1 | 2/2002 | Zalewski et al. | |
| 2002/0178282 A1 | 11/2002 | Mysore et al. | |
| 2004/0098490 A1 | 5/2004 | Dinker et al. | |
| 2005/0259574 A1 * | 11/2005 | Figueira et al. | ............... 370/229 |
| 2006/0200821 A1 | 9/2006 | Cherkasova et al. | |
| 2006/0206891 A1 | 9/2006 | Armstrong et al. | |
| 2007/0294450 A1 | 12/2007 | Rudnick et al. | |

FOREIGN PATENT DOCUMENTS

| | | |
|---|---|---|
| CN | 101164051 A | 4/2008 |
| EP | 1016957 A2 | 7/2000 |
| JP | 2006202244 A | 8/2006 |

OTHER PUBLICATIONS

PCT/EP2010/052076—International Search Report—Dated Sep. 28, 2010.
PCT/EP2010/052076—Written Opinion—Sep. 28, 2010.
SunONE; Chapter 14—Creating and Configuring Virtual Servers; pp. 1-9—Feb. 4, 2009.

(Continued)

*Primary Examiner* — Scott Christensen
(74) *Attorney, Agent, or Firm* — Cantor Colburn LLP; Margaret McNamara

(57) ABSTRACT

A method for controlling the allocation of shared resources that includes receiving, from a requestor executing on a processor, a request to access a shared resource. The receiving is at a next request priority module connected to the processor and the shared resource. It is determined if any of a specified number of most recent priority grants to the shared resource were to the requestor. The request is granted if none of the specified number of most recent priority grants to the shared resource were to the requestor. If any of the specified number of most recent priority grants to the shared resource were to the requestor, then it is determined if one or more other requests for the shared resource are pending. It is determined if one of the other requests should be granted priority to the shared resource if other requests for the shared resource are pending.

11 Claims, 4 Drawing Sheets

(56) References Cited

OTHER PUBLICATIONS

Predictive Control for Dynamic Resource Allocation in Enterprise Data Centers; Wei Xu et al.; HP Laboratories Palo Alto; HPL-2005-194 (R.1) Jan. 23, 2006 pp. 1-13.

European Office Action dated Sep. 5, 2013, Application No. 10 715 512.9-1954; 8 pages.
U.S. Appl. No. 12/392,665, filed Feb. 25, 2009; Final Office Action mail date Aug. 14, 2013; pp. 1-17.

* cited by examiner

US 8,788,672 B2

MICROPROCESSOR WITH SOFTWARE CONTROL OVER ALLOCATION OF SHARED RESOURCES AMONG MULTIPLE VIRTUAL SERVERS

CROSS-REFERENCE TO RELATED APPLICATION

This application is a continuation of U.S. patent application Ser. No. 12/392,665, filed Feb. 25, 2009, the content of which is hereby incorporated by reference herein in its entirety.

BACKGROUND

This invention relates generally to processing within a computing environment, and more particularly to allocating shared resources in a computing environment.

Overall computer system performance is affected by each of the key elements of the computer structure, including the performance/structure of the processor(s), any memory cache(s), the input/output (I/O) subsystem(s), the efficiency of the memory control function(s), the main memory device(s), and the type and structure of the interconnect interface(s).

Extensive research and development efforts are invested by the industry, on an ongoing basis, to create improved and/or innovative solutions to maximizing overall computer system performance and density by improving the system/subsystem design and/or structure. High-availability systems present further challenges as related to overall system reliability due to customer expectations that new computer systems will markedly surpass existing systems in regard to mean-time-between-failure (MTBF), in addition to offering additional functions, increased performance, increased storage, lower operating costs, etc. Other frequent customer requirements further exacerbate the computer system design challenges, and include such items as ease of upgrade and reduced system environmental impact (such as space, power, and cooling).

Current microprocessors have many processors, each running many threads of execution. For example, a current microprocessor may have eight processors, each with four threads, with hypervisor software being utilized to manage the multiple virtual processors. The number of simultaneous threads being executed is predicted to increase and in the future and microprocessors will likely have dozens of threads running simultaneously.

Microprocessors have many hardware resources that are shared by the multiple virtual processors that are under the control of the hypervisors. These shared resources include physical processors, caches, interconnection networks that provide cache coherence among multiple caches, memory controllers, input/output (I/O) controllers etc. Current microprocessor hardware designs rely on the hypervisor software combined with hardware timers in each physical processor to insure that virtual processors receive a fair share of the physical hardware resources. In current designs, virtual processors rely on the hypervisor to dispatch virtual processes onto physical processors in a manner that will provide each processor a fair share of "down-stream" shared resources such as cache accesses and memory controller accesses.

BRIEF SUMMARY

An exemplary embodiment of the present invention includes a method for controlling the allocation of shared resources. The method includes receiving a request to access a shared resource. The request is received from a requestor executing on a processor. The receiving is at a next request priority module connected to the processor and the shared resource. It is determined if any of a specified number of most recent priority grants to the shared resource were to the requestor. The request is granted to the shared resource if none of the specified number of most recent priority grants to the shared resource were to the requestor. If it is determined that any of the specified number of most recent priority grants to the shared resource were to the requestor, then it is determined if one or more other requests for the shared resource are pending. It is determined if one of the other requests should be granted priority to the shared resource if other requests for the shared resource are pending.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

An exemplary embodiment of the present invention provides hardware controls at the entrances to shared resources that limit the number of requests that can be dedicated to a single virtual server or group of virtual servers.

In current microprocessor hardware designs, a single virtual server that has many virtual processors could create large demands for shared hardware resources outside the microprocessor core. The demands could be large enough to create a performance impact on other virtual servers currently running on the same hardware system. In the past, it was relatively easy for a hypervisor, or any similar software system, to monitor the progress of the virtual servers and restrict the dispatching of a virtual processor that was making progress at the expense of others. This becomes more difficult for the hypervisor to monitor when there are more threads per virtual server, and as the number of physical processor cores (also referred to herein as core processors or processors) on a single microprocessor chip grows from the current one to eight to an even larger number.

In addition, excessive demands on system resources could be made by a virtual server running a workload with very poor cache behavior or by a malicious virus program that intends to disrupt the operation of a physical server (among other possibilities).

An exemplary embodiment of the present invention allows a hypervisor or other control program to set limits on the hardware resources that can be consumed by a virtual server or by a group of virtual servers. An exemplary embodiment of the present invention provides the ability to limit the maximum share of resources that can be consumed by a single virtual server. These limits can be set by the hypervisor or another control program. In an exemplary embodiment, a virtual server identifier (VSID) is assigned to each unique virtual server under the control of the hypervisor. The VSID is sent with any requests that leave the processor and attempt to use shared resources on the microprocessor chip or on other chips or interfaces in the system. Hardware and/or software controls prevent any single virtual server or group of virtual servers from occupying more than a certain percentage of the hardware resources.

Figure 1:
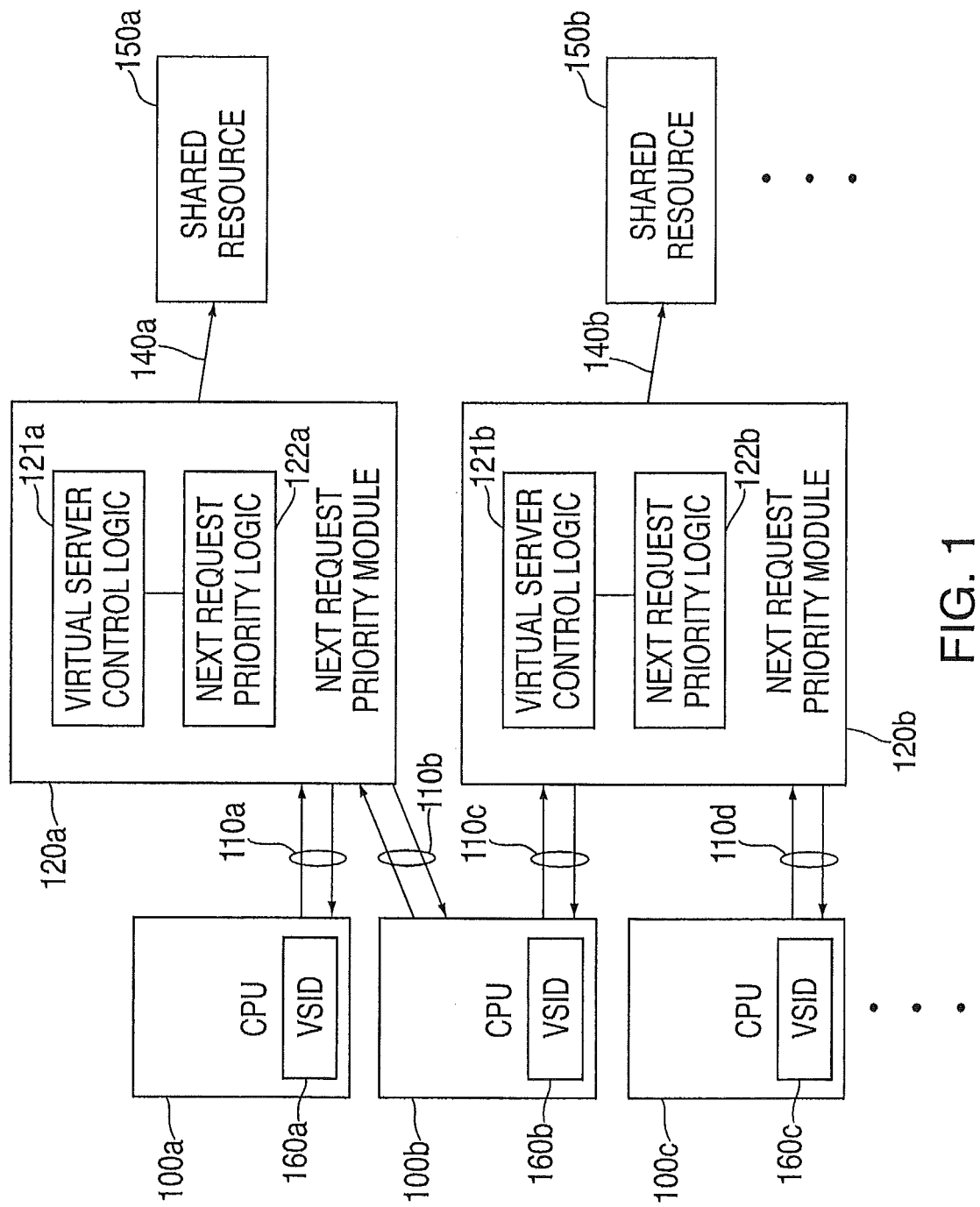
FIG. 1 depicts a computing system with several processors and shared system resources that that may be implemented by an exemplary embodiment of the invention.

FIG. 1 depicts a portion of a multiprocessor computing system that may be implemented by an exemplary embodiment. Each core processor 100 is connected to one or more shared resources 150 via specialized interfaces 110 140 and a next request priority module 120. In an exemplary embodiment of the present invention, the next request priority module 120 is implemented in software. In an exemplary embodiment of the present invention, the next request priority module 120 is part of system control logic (SCL) that is located between a core processor 100 and a shared resource 150. The SCL provides a physical interconnection among a plurality of microprocessor cores and between those cores and other system elements such as memory, data caches, I/O controllers, specialized accelerators, data compression engines, etc. Contemporary computing systems utilizing a centralized switch structure may have the SCL implemented on one or more chips dedicated to the switch function. These switch chips are then connected to microprocessor chips and arrays of memory chips and other elements of the system. Computing systems utilizing a distributed switch structure may implement a portion of the SCL on each of the microprocessor chips. In this case, the microprocessor chips are connected directly to each other and the interfaces used for those connections are controlled by the SCL. The SCL works to control the flow of requests between the source microprocessor core and the shared system resource. It also controls the returning flow of data.

In either the centralized switch case or the distributed switch case, a computing system which uses an embodiment of the current invention may also place a portion of the SCL at a point that is closest to the shared resource, on a memory DRAM for example, in addition to typical locations for the SCL seen in current systems. Other exemplary embodiments of the current invention may place part of the SCL at either end of a shared communication interface such as the memory controller logic that drives an otherwise standard memory interface. The placement of portions of the SCL in a particular computing system design will depend on a large number of factors including, but not limited to, available logic space, power dissipation and design complexity. Since many current designs contain multithreaded processors, in the exemplary embodiments the critical shared resources may also be located on the same microprocessor chip as the core, and therefore a portion of the SCL may be located there as well. Other exemplary embodiments may place the logic at the beginning of a shared pipeline of logic that leads to a shared resource such as a SRAM or eDRAM data cache.

One core processor 100b in the system depicted in FIG. 1 is connected to next request priority module 120a via interface 110b. The same core processor 100b is also connected to next request priority module 120b via another dedicated interface 110c. Access to the shared resources 150 is controlled by the next request priority modules 120.

The next request priority modules 120 depicted in FIG. 1 include virtual server control logic 121 and next request priority logic 122. An exemplary embodiment of the virtual server control logic 121 is described below with respect to FIG. 2. An exemplary embodiment of the next request priority logic 122 is described below with respect to FIG. 4.

An exemplary embodiment of the invention uses a number of IBM P6 microprocessors, each of which has four processing cores. Exemplary embodiments of the invention can be used on systems with any number of microprocessor chips. In addition, exemplary embodiments may be implemented with any type of microprocessor, containing any number of core processors. Further, exemplary embodiments may be used in combination with microprocessors that support any of a number of multithreading implementations.

As depicted in FIG. 1, a VSID register 160 is provided for each of the core processors 100 in the system. The VSID registers 160 may be written to by software executing on the core processors 100. An exemplary embodiment of the present invention uses a hypervisor to perform this task. In a system where multithreading is expected to be active and where individual threads may be assigned to run software from multiple virtual servers at once, a VSID register 160 can be provided for each thread. In an exemplary embodiment of the present invention, the hypervisor selects a VSID for each virtual server that it controls. When a virtual server is dispatched onto a physical processor (e.g., a core processor 100), the VSID is written into the VSID register 160 for that core processor 100.

The contents of the VSID register 160 are included with command, address and data that are communicated over interfaces 110 towards the shared resources 150. The interfaces 110 may be similar to current request interfaces such as those used to connect with contemporary memory controllers. The combination of the VSID information and the prior-art command, address and data information are used by logic downstream from the core processor 100 to control the access to the shared resources 150. An exemplary embodiment of the invention uses the next request priority module 120 to control access to shared resources 150 that are outside of (i.e., not located on) the microprocessor chip having core processors 100a-100c. Other embodiments may use similar hardware and methods to control access to resources that are located inside of the microprocessor chip such as on-chip memory controllers, on-chip I/O controllers, on-chip data caches or any other on-chip resource.

In an exemplary embodiment of the present invention, the VSID is unique for each virtual server that the hypervisor is currently hosting on the computing system. Other embodiments of the invention may use a hash of the unique VSID or a simple subset of the bits of the full VSID. One exemplary embodiment of the invention uses just the two lowest order bits of the VSID in order to reduce the hardware overhead required to add the VSID to the request information that must be communicated from the core processors 100 to the shared resources 150. The use of a subset of the VSID reduces the level of accuracy of the distribution of request slots to virtual servers but will still be able to prevent unpredictable performance for most virtual servers running on the computing system.

As used herein, the VSID is an example of a requestor identifier that may be utilized to associate a requestor (e.g., a virtual server) to a request for a shared resource (e.g. a memory). Other requestor identifiers may be utilized without departing from the scope of the invention.

The interconnection between the core processors 100 and the shared resources 150 is shown in FIG. 1 as a collection of point-to-point busses 110, 140. Alternate exemplary embodiments of the invention may utilize any other type of interconnection such as a shared bus, a full crossbar switch or a series of interconnected switches among many other configurations.

Figure 2:
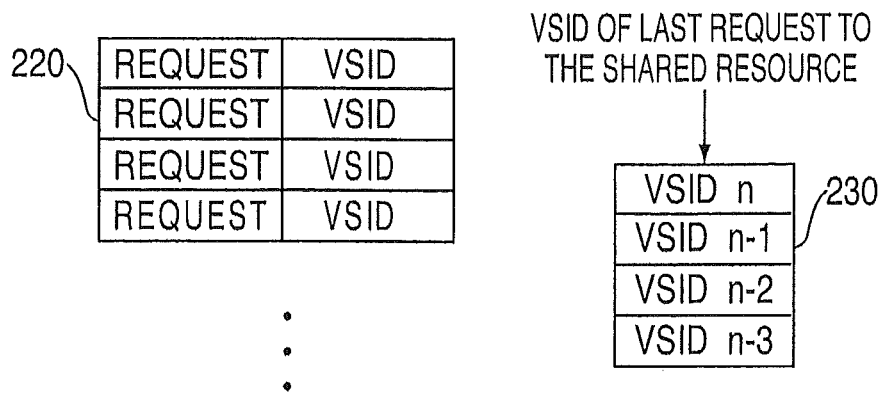
FIG. 2 depicts virtual server control logic hardware that may be implemented by an exemplary embodiment of the invention.

FIG. 2 depicts virtual server control logic 121 that may be utilized by an exemplary embodiment of the invention. The virtual server control logic 121 depicted in FIG. 2 includes a group of registers 220 that make up a request queue for storing pending requests for a shared resource 150. The registers 220 also contain requestor identifiers (e.g., VSIDs) for each request. The requestor identifiers correlate the request to the requestor (e.g., a virtual server executing on a core processor 100). The request queue is ordered (e.g., based on how long each request has been in the queue, a combination of time in the queue and a priority associated with the requestor, etc.) and one of the requests is designated as a next request that will be evaluated for processing when the shared resource 150 is available to process a new request. The registers 220 contain the pending requests that have arrived from a core processor 100 via one of the interfaces 110. An exemplary embodiment of the invention allows four requests to be held pending; other embodiments may use any number of additional (or fewer) registers for this function. The number of requests held in the queue could also be designed with a programmable depth.

An exemplary embodiment of the invention also includes a previous requestor queue made up of a plurality of registers 230. Exemplary embodiments of the present invention implement the previous requestor queue using a four position deep first-in-first-out buffer to hold the VSIDs of the last four requests to be granted priority to the shared resource 150. Any other depth of the buffer could be used. The buffer could also be designed with a programmable depth. In an exemplary embodiment, the depth is set by the hypervisor or by any other suitable supervisor software or by a suitable hardware algorithm. In an exemplary embodiment, the depth of the buffer is set during the initial power-on sequence of the system and then altered at a future time by the hypervisor.

The request queue 220 depicted in FIG. 2 is an example of a pending request mechanism that may be implemented by an exemplary embodiment of the invention. Other manners of implementing a pending request mechanism in hardware and/or software may be utilized by exemplary embodiments of the present invention. For example, the pending request mechanism could be designed to favor a particular VSID. The favored VSID could be guaranteed a specific fraction of use of the shared resource, twenty-five percent for example.

Similarly, the previous requestor queue 230 depicted in FIG. 2 is an example of a logging mechanism that may be implemented by an exemplary embodiment of the invention. Other manners of implementing a logging mechanism in hardware and/or software may be utilized by exemplary embodiments of the present invention. For example, the logs could be implemented as a set of counters that increment each time a request with a particular VSID is granted priority for the next use of the shared resource. Each counter could be assigned a range of VSIDs. It should be understood that a wide range of combinations of pending request mechanisms and logging mechanisms may be used to implement the current invention. Any suitable logic that uses the state of the logging mechanism together with the state of the pending request mechanism may be used to determine the next request to be sent to the shared resource.

An exemplary embodiment of the invention uses a memory as a shared resource 150. Memory system 300 in FIG. 3A from U.S. Pat. No. 7,320,047 is one example of a prior art memory system that can be used with an exemplary embodiment of the invention. The memory system 300 includes a memory controller 310, a plurality of point-to-point links 320a-320n, a plurality of memory subsystems 330a-330c, and a plurality of memory subsystem ports 378a-378n on an interface 375. A more detailed depiction of memory subsystem 330a is illustrated as memory subsystem 340 in FIG. 3A. Memory subsystem 340 includes a buffer device 350 and a plurality of memory devices 360 disposed on the memory subsystem 340. The buffer device 350 is coupled to the plurality of memory devices 360 via channels 370.

Figure 3A:
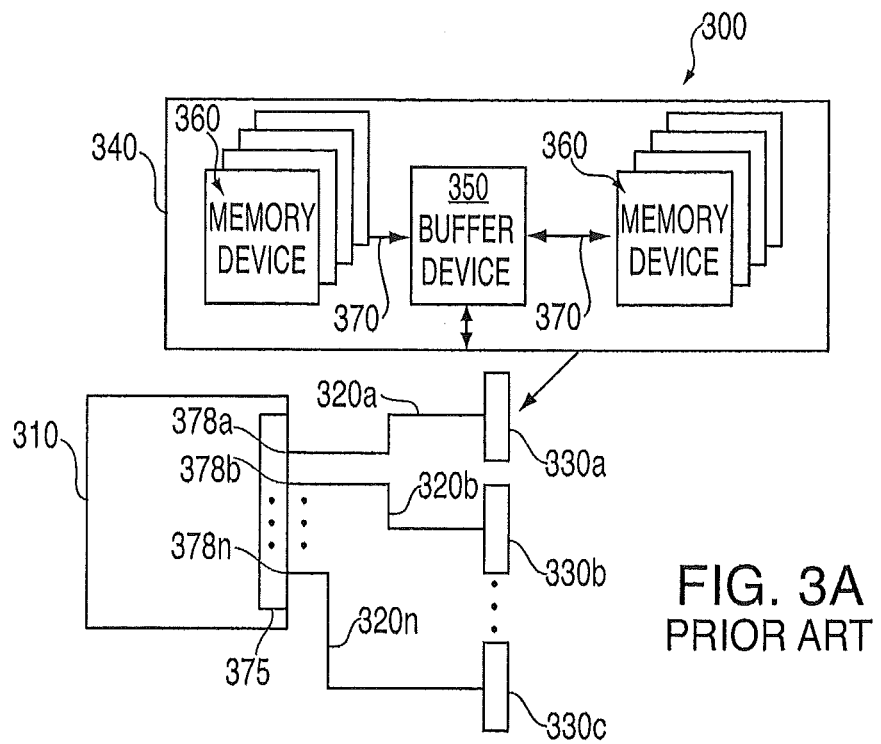
FIG. 3A depicts a prior art memory controller.
Figure 3B:
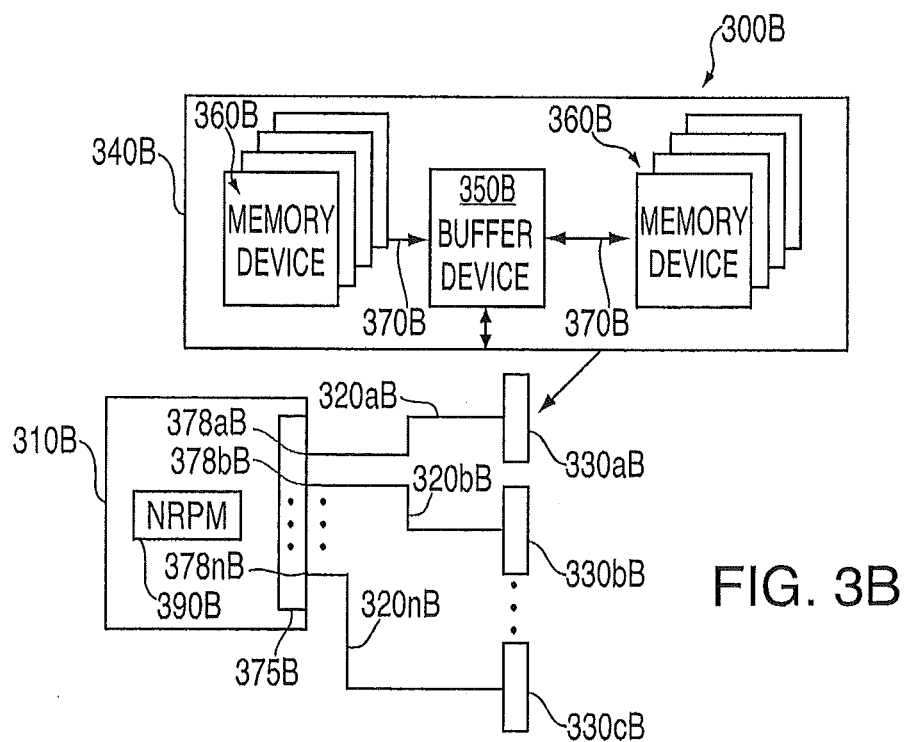
FIG. 3B depicts a memory controller that may be implemented by an exemplary embodiment of the invention.

Memory system 300B depicted in FIG. 3B depicts an exemplary embodiment that may be implemented with the prior art memory system depicted in FIG. 3A. Similar to FIG. 3A, FIG. 3B depicts a memory system 300B that includes a memory controller 310B, a plurality of point-to-point links 320aB-320nB, a plurality of memory subsystems 330aB-330cB, and a plurality of memory subsystem ports 378aB-378nB on an interface 375B. A more detailed depiction of memory subsystem 330aB is illustrated as memory subsystem 340B in FIG. 3B. Memory subsystem 340B includes a buffer device 350B and a plurality of memory devices 360B disposed on the memory subsystem 340B. The buffer device 350B is coupled to the plurality of memory devices 360B via channels 370B. The memory controller 310B depicted in FIG. 3B also includes next request priority logic 120,130, shown as element 390B in FIG. 3B. The depicted exemplary embodiment locates the next request priority module 390B in the memory controller 310B but it should be understood that it could also be located in the memory buffer device 350B or in the memory devices 360B. Exemplary embodiments are not limited to use in memory systems, as any other shared resource can be controlled in a similar way.

Figure 4:
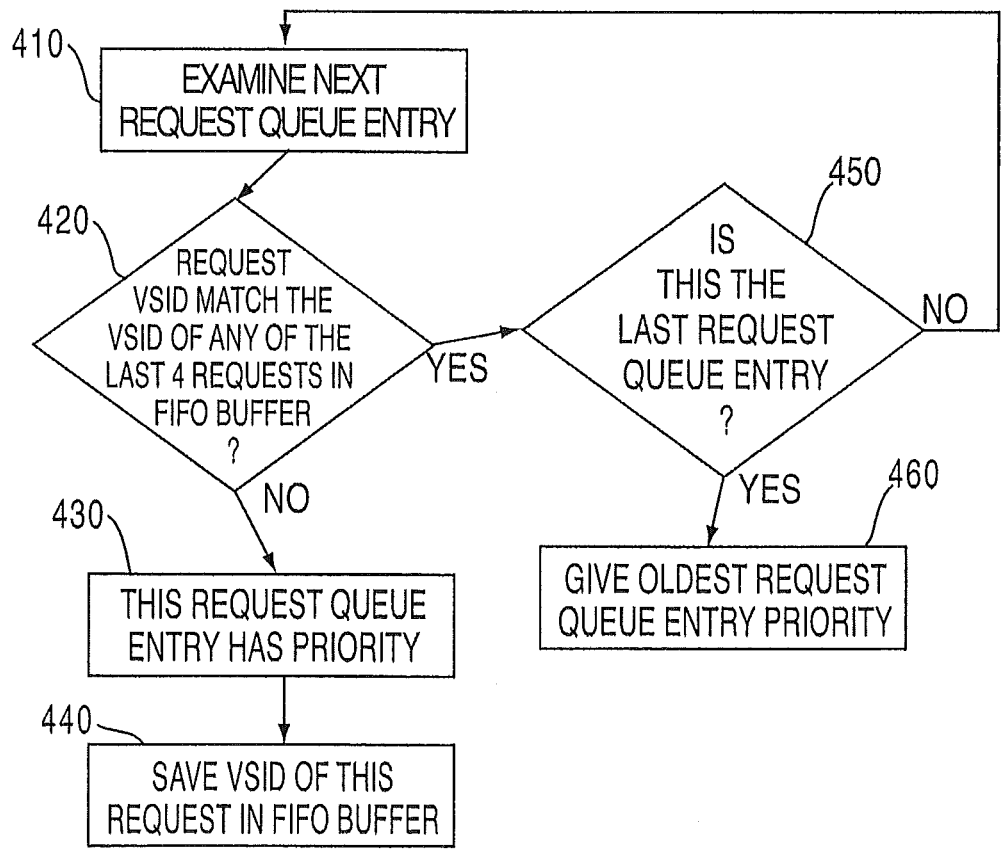
FIG. 4 depicts a generalized flowchart for choosing the next request to be sent to the shared system resource that may be implemented by an exemplary embodiment of the invention.

FIG. 4 depicts a generalized flowchart for choosing the next request to be sent to the shared system resource 150 that may be implemented by an exemplary embodiment of the invention. FIG. 4 illustrates the functions implemented in the next request priority logic 122 which manages the virtual server control logic 121 and the request interface 140. At block 410, the next request priority logic 122 examines the next entry in the request queue. As described before, in one exemplary embodiment of the present invention the next entry is the oldest entry in the request queue. At block 420, it is determined if the requestor identifier associated with the next entry matches any of the entries in the previous requestor queue. In the exemplary embodiment depicted in FIG. 4, the previous requestor queue is implemented by a four deep first-in-first-out buffer that contains the requestor identifiers of the last four requestors who were granted priority to the shared resource. In this example, four is the specified number of most recent priority grants, in other embodiments other specified numbers are implemented.

If it is determined, at block 420, that the requestor identifier matches any of the requestor identifiers in the previous requestor queue, then processing continues at block 450 where it is determined if the next request is the last request in the request queue. In this case the requestor should be granted priority to the shared resource 150 because no other requestors are waiting for the shared resource 150; the requestor is granted priority to the shared resource at block 460. In an alternate exemplary embodiment, a different action is taken when there is only one request in the request queue and its associated requestor identifier has been found in the previous requestor queue. In this alternate exemplary embodiment, no priority is given to the next request and no request is sent to the shared resource 150 in the next cycle. This might be desirable when the service time for the request is long in comparison to the number of requests that the shared resource 150 can handle at once.

If it is determined at block 450 that the next request is not the last request in the request queue, then another request in the queue is designated as the next request (e.g., based on it being the next oldest request, or some other priority scheme) and processing continues at block 410.

It is determined, at block 420, that the requestor identifier does not match any of the requestor identifiers in the previous requestor queue, then processing continues at block 430. At block 430, the next request is granted priority to the shared resource 150. At block 440, the requestor identifier associated with the next request is added to the previous requestor queue. In an exemplary embodiment of the invention, the new requestor identifier replaces the oldest entry in the previous requestor queue. The request that is granted priority becomes the next request to be sent to the shared resource 150 via interface 140.

FIG. 4 depicts one processing flow that may be implemented by an exemplary embodiment and other processing flows may be implemented by alternative exemplary embodiments of the present invention. For example, in another exemplary embodiment of the invention, a priority function which favors requests from one or more particular virtual servers over the requests of all others is implemented by assigning a requestor identifier to one or more virtual servers and by selecting how many previous requestor identifiers to save in the previous requestor queue (or other logging mechanism). In one example, a particular virtual server could be guaranteed at least ten percent of request slots for a memory controller that is shared among many CPUs.

In another exemplary embodiment of the invention a request tag that is similar in function to the VSID (an example of a requestor identifier) is used, but it is produced by a different layer of software. An exemplary embodiment uses a VSID that is produced by a hypervisor, however, any individual operating system could produce a set of process IDs (PIDs) that identify individual units of work running on that operating system. These PIDs are another type of requestor identifier that could be implemented and they could be written directly to the same hardware registers as the VSIDs during dispatch.

In another exemplary embodiment, the hardware is designed to intercept an attempt by the operating system to change the VSID of the CPU and then pass control of the CPU to a hypervisor. In this case, the hypervisor would use any number of algorithms to determine what value the VSID hardware register should be set to.

Technical effects and benefits include the ability for a physical computer server to provide a reliable level of high performance when running a large number of virtual servers. The server allows a hypervisor or other control program to set limits on the hardware resources that can be consumed by a virtual server or by a group of virtual servers. This provides the ability to limit the maximum share of resources that can be consumed by a single virtual server and may result in increased performance of the processor.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium. Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 5:
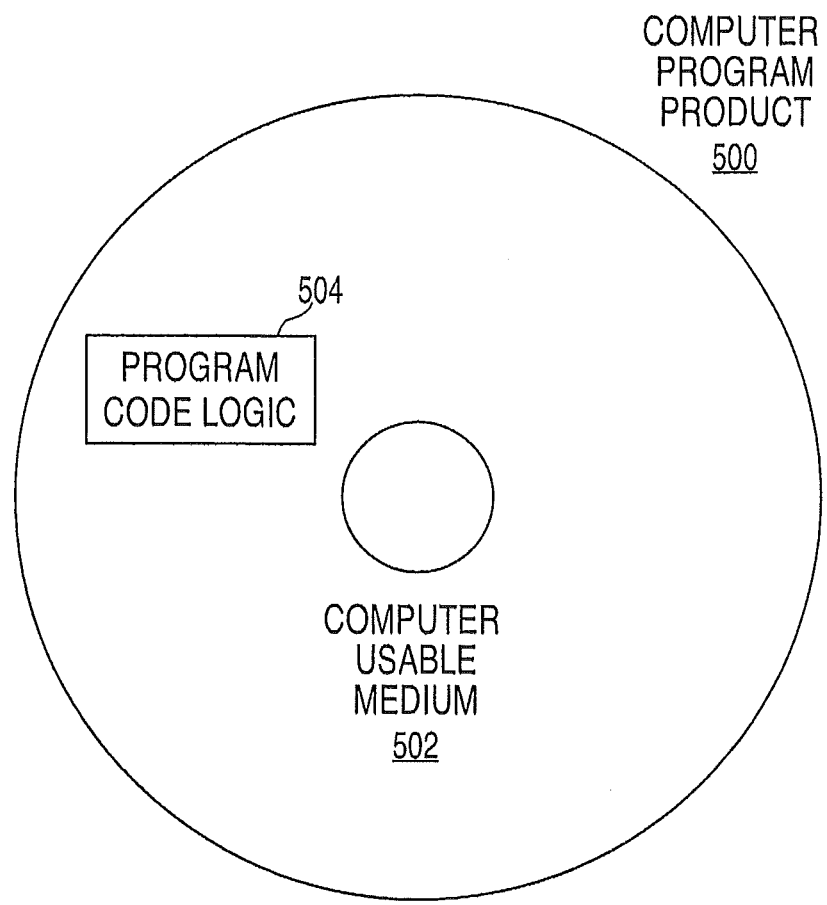
FIG. 5 depicts a computer program product that may be implemented by an exemplary embodiment of the invention.

As described above, embodiments can be embodied in the form of computer-implemented processes and apparatuses for practicing those processes. In exemplary embodiments, the invention is embodied in computer program code executed by one or more network elements. Embodiments include a computer program product 500 as depicted in FIG. 5 on a computer usable medium 502 with computer program code logic 504 containing instructions embodied in tangible media as an article of manufacture. Exemplary articles of manufacture for computer usable medium 502 may include floppy diskettes, CD-ROMs, hard drives, universal serial bus (USB) flash drives, or any other computer-readable storage medium, wherein, when the computer program code logic 504 is loaded into and executed by a computer, the computer becomes an apparatus for practicing the invention. Embodiments include computer program code logic 504, for example, whether stored in a storage medium, loaded into and/or executed by a computer, or transmitted over some transmission medium, such as over electrical wiring or cabling, through fiber optics, or via electromagnetic radiation, wherein, when the computer program code logic 504 is loaded into and executed by a computer, the computer becomes an apparatus for practicing the invention. When implemented on a general-purpose microprocessor, the computer program code logic 504 segments configure the microprocessor to create specific logic circuits.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A method for controlling the allocation of shared resources, the method comprising:
receiving a request to access a shared resource in a request queue, wherein the request queue receives pending requests for the shared resource from each of a plurality of requestors, the request received from a requestor of the plurality of requestors executing on a processor, the receiving at a next request priority module connected to the processor and to the shared resource, and preventing the requestor from occupying more than a predefined portion of the shared resource for limiting an amount of the shared resource that is consumable;
determining that at least one of a specified number of most recent priority grants to the shared resource were to the requestor based on a requestor identifier of the requestor and a plurality of logged requestor identifiers in a previous requestor queue;
granting priority to the shared resource to the request based on determining that none of the specified number of most recent priority grants to the shared resource were to the requestor;
logging the requestor identifier of the requestor in the previous requestor queue based on the granting; and
based on determining that any of the specified number of most recent priority grants to the shared resource were to the requestor:
determining that one or more other requests for the shared resource are pending in the request queue;
determining that one of the other requests pending in the request queue should be granted priority to the shared resource based on determining that one or more other requests to the shared resource are pending in the request queue; and
transmitting no request to the shared resource during a next cycle based on the request being the only pending request in the request queue and based on the requestor identifier of the requestor matching any of the plurality of logged requestor identifiers in the previous requestor queue.

2. The method of claim 1, further comprising granting priority to the shared resource to the request based on determining that other requests to the shared resource are not pending.

3. The method of claim 1, wherein the next request priority module is implemented by System Control Logic (SCL).

4. The method of claim 1, further comprising transmitting the request to the shared resource based on granting priority to the shared resource to the request.

5. The method of claim 1, further comprising determining that the request should be granted priority to the shared resource based on the request being the only pending request in the request queue.

6. The method of claim 1, wherein only requestor identifiers of the specified number of most recent priority grants to the shared resource are saved in the previous requestor queue.

7. The method of claim 1, further comprising determining that none of the specified number of most recent priority grants to the shared resource were to the requestor based on the requestor identifier of the requestor not matching any of the plurality of logged requestor identifiers in the previous requestor queue.

8. The method of claim 1, wherein the requestor is a group of virtual servers.

9. The method of claim 1, wherein the shared resource is memory and the next request priority module is located in a memory controller.

10. The method of claim 1, further comprising transmitting the request to the shared resource based on the granting of priority to the shared resource to the request.

11. The method of claim 1, further comprising logging the requestor identifier of the requestor by replacing an oldest entry in the previous requestor queue with a new entry corresponding to the requestor identifier of the request based on the granting.

* * * * *